United States Patent
Gillespie et al.

(10) Patent No.: US 6,710,753 B2
(45) Date of Patent: Mar. 23, 2004

(54) MULTI-SCREEN SESSION MOBILITY BETWEEN TERMINAL GROUPS

(75) Inventors: Brian J. Gillespie, Drymcondra (IE); James G. Hanko, Redwood City, CA (US); Robert A. Doolittle, Menlo Park, CA (US); Gerard A. Wall, San Jose, CA (US); Aniruddha Mitra, San Carlos, CA (US)

(73) Assignee: Sun Micosystems, Inc., Palo Alto, CA (US)

( * ) Notice: Subject to any disclaimer, the term of this patent is extended or adjusted under 35 U.S.C. 154(b) by 448 days.

(21) Appl. No.: 09/747,427

(22) Filed: Dec. 22, 2000

(65) Prior Publication Data

US 2002/0196196 A1 Dec. 26, 2002

Related U.S. Application Data

(60) Provisional application No. 60/241,342, filed on Oct. 17, 2000.

(51) Int. Cl.[7] .................................................. G09G 5/00
(52) U.S. Cl. ........................... 345/2.1; 345/2.3; 345/4; 345/903; 709/203; 709/217; 709/219
(58) Field of Search .......................... 345/1.1–2.3, 736, 345/744, 903; 709/200, 203, 204, 205, 217, 218, 219

(56) References Cited

U.S. PATENT DOCUMENTS 5,748,189 A      5/1998   Trueblood
5,805,118 A      9/1998   Mishra et al.
6,088,005 A  *   7/2000   Walls et al. .................... 345/4
6,323,854 B1 *  11/2001   Knox et al. .................. 345/418
2001/0011965 A1 *  8/2001   Wilks ......................... 345/1.1
2002/0175924 A1 * 11/2002   Yui et al. .................... 345/660

* cited by examiner

Primary Examiner—Amr Awad
(74) Attorney, Agent, or Firm—O'Melveny & Myers LLP

(57) ABSTRACT

The present invention is for multi-screen session mobility between terminal groups. The invention uses a set of screen groups and a set of terminal groups to perform a mapping of the screen groups onto the terminal groups. Both the screen groups and the terminal groups have a geometry, which in one embodiment is defined by columns and rows. In cases where the number of columns in the screen group is less then or equal to the number of columns in the terminal group and where the number of rows in the screen group is also less then or equal to the number of rows in the terminal group, a first mapping scheme is employed. In cases where the number of columns in the screen group exceeds the number of columns in the terminal group or the number of rows in the screen group exceeds the number of rows in the terminal group, a second mapping scheme is employed. In one embodiment, the first mapping scheme maps the screen group directly onto the terminal group. In one embodiment, where the second mapping scheme is employed, screen flipping is used to allow a user to navigate within the terminal group where there are more screens than can be viewed at one time using the terminal group.

18 Claims, 11 Drawing Sheets

MULTI-SCREEN SESSION MOBILITY BETWEEN TERMINAL GROUPS

This application claims the benefit of provisional 60/241,342, filed on Oct. 17, 2000.

BACKGROUND OF THE INVENTION

1. Field of the Invention

The present invention relates to multi-screen session mobility between terminal groups.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

In modem computing a user might have many computer programs running at the same time. In this situation, the user may want to switch between the computer programs. The number of running computer programs may become so large that the physical size of the output device will be too small to effectively show the user all of the programs. This makes it difficult for the user to switch between the programs.

One solution is to display the larger computing environment on more than one output device, termed a "multi-head" configuration. Using the multi-head configuration, a user will operate a computer and have the multiple output devices arranged in such a manner that the entire environment can be displayed on the output devices. One example of such an arrangement is shown in FIG. 1. Computing environment 100 is partitioned into segments 110–130. Segments 110–130 are displayed on output devices 140–160. In this configuration three output devices are used where there is one row of such devices and three columns, but other two dimensional arrangements are equally applicable.

Problems occur with the multi-head configuration when a user desires to stop the interacting with the device connected to the multi-head configuration, such as a computer, an access terminal, or a human interface device, moves to a new device. Specifically, it is problematic when the user expects to begin interacting with the new device at precisely the point where the user stopped interacting with the first device and the different locations have different output configurations. For instance, the three screen output configuration of FIG. 1 may differ in a new location where there night be only one output device or another multi-head configuration, such as one where there are multiple rows. It is difficult to map the output of the computing device to an arbitrary configuration of output devices.

SUMMARY OF THE INVENTION

The present invention is for multi-screen session mobility between terminal groups. The invention uses a set of screen groups and a set of terminal groups to perform a mapping of the screen groups onto the terminal groups. A terminal group is a set of logically associated terminals (e.g., output devices). A screen group is a set of screens associated with a single display for a single session that is output by a computing device, such as a server computer. Both the screen groups and the terminal groups have a geometry, which in one embodiment is defined by columns and rows.

In cases where the number of columns in the screen group is less then or equal to the number of columns in the terminal group and where the number of rows in the screen group is also less then or equal to the number of rows in the terminal group, a first mapping scheme is employed. In cases where the number of columns in the screen group exceeds the number of columns in the terminal group or the number of rows in the screen group exceeds the number of rows in the terminal group, a second mapping scheme is employed.

In one embodiment, the first mapping scheme maps the screen group directly onto the terminal group. In one embodiment, where the second mapping scheme is employed, screen flipping is used to allow a user to navigate within the terminal group where there are more screens than can be viewed at one time using the terminal group.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is for multi-screen session mobility between terminal groups. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Definitions

A terminal group is a logically associated set of terminals. A terminal group has a primary terminal and one or more secondary terminals. The arrangement of terminals forms a multi-headed configuration, for instance a rectangular configuration defined by its columns and rows.

A primary terminal is one that is significant in logging on to a machine. For instance a primary terminal may be one where the user inserts a smart card to initiate a log-in session.

A screen group is a set of screens associated with a single display for a single session that is output by a computing device, such as a server computer. The geometry of a screen group may be defined by its columns and rows.

When moving a computing session between computing devices, such as access terminals, human interface devices, etc., such an action is defined as a transient mapping of a screen group onto a terminal group.

The time at which a computing device (such as a server) determines the most appropriate mapping between the screen group, which is fixed, and a particular terminal group is termed the connect time.

Mapping

At connect time, the computing device is typically offered a list. The list comprises a description of the terminal group. One type of list is presented as a row-major order list of terminal addresses. The list further comprises the location of the primary terminal within the list and the geometry of the group comprising the addresses in the list. The computing device receives the list and uses it to make the most appropriate mapping between its screen group and the offered terminal group.

Figure 1:
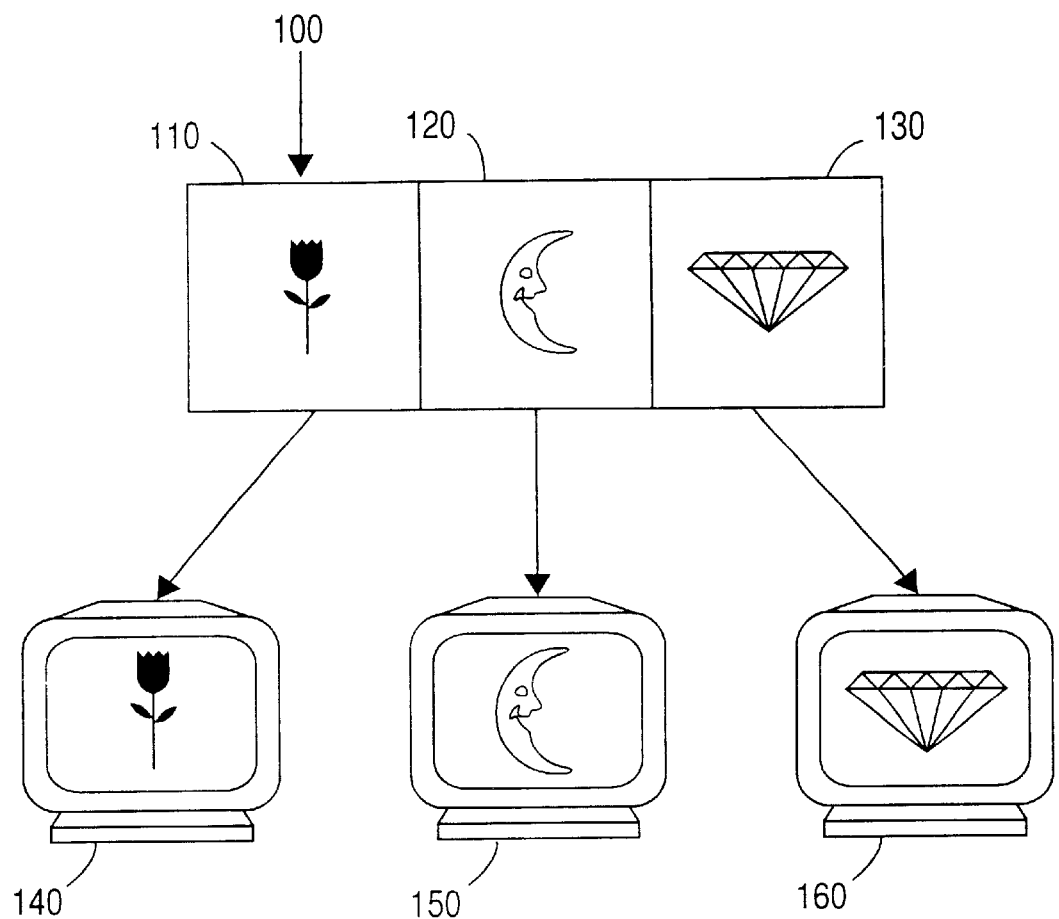
FIG. 1 is an example of a multi-head configuration.
Figure 2:
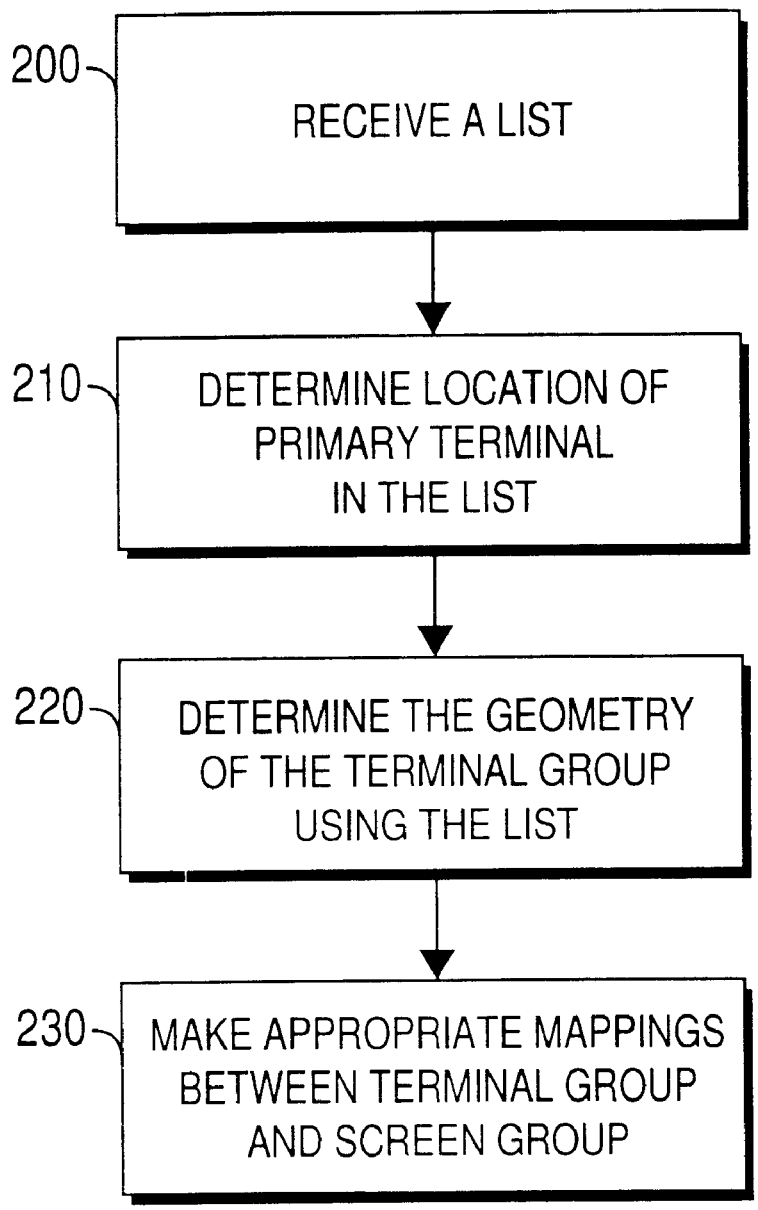
FIG. 2 shows a mapping of a screen group onto a terminal group according to one embodiment of the present invention.

FIG. 2 shows how this mapping takes place in one embodiment of the present invention. At step 200 a computing device receives a list. Then, at step 210 the computing device determines the location of the primary terminal within the list. Next, at step 220 the computing device determines the geometry of the terminal group using the list. Finally, at step 230 the computing device makes the appropriate mapping between the terminal group and its screen group.

There are circumstances where terminal groups are not easily mapped onto screen groups and there are situations where such mappings are more easily performed. In one embodiment, the invention must first determine which scenario is occurring before proceeding to perform the mapping. This embodiment of the present invention is shown in FIG. 3.

Figure 3:
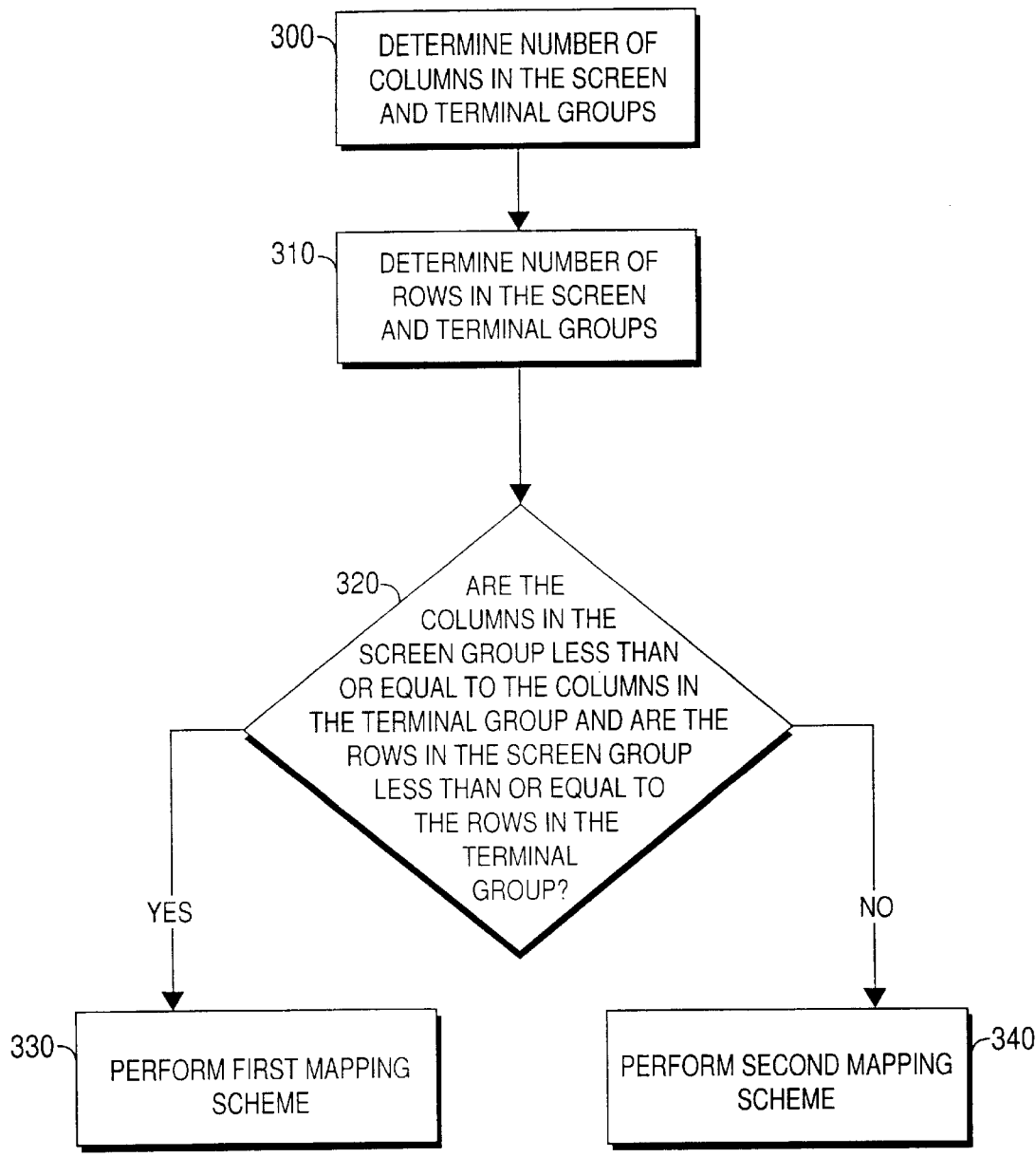
FIG. 3 shows a mapping of a screen group onto a terminal group according to one embodiment of the present invention.

At step 300 of FIG. 3, the number of columns in the screen group and the number of columns in the terminal group are determined. Then, at step 310, the number of rows in the screen and terminal groups are determined. Next, at step 320, it is determined whether the columns in the screen group are less then or equal to the columns in the terminal group and the rows in the screen group are less then or equal to the rows in the terminal group. If this is the case, then a first mapping scheme is performed at step 330. The first mapping scheme is termed a direct mapping scheme. Otherwise, a second mapping scheme is performed at step 340. The second mapping scheme is termed a degenerate mapping scheme.

The direct mapping scheme is simple because the computing device performing the mapping may use all of the terminals in the terminal group for displaying its output. The degenerate mapping scheme, on the other hand, is more complex because the computing device performing the mapping must use fewer then the total offered addresses which imposes screen access and navigation constraints. The first and second mapping schemes of the present invention are discussed below.

Direct Mapping Scheme

If the columns in the screen group are less then or equal to the columns in the terminal group and the rows in the screen group are less then or equal to the rows in the terminal group then a direct mapping scheme is employed. One example of such a scheme occurs where the terminal and screen groups have identical numbers of rows and columns. In this case the mapping is trivial. One example of such a mapping would be as follows:

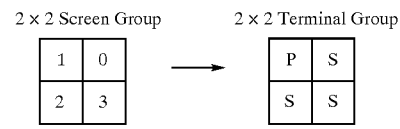

If the columns or rows in the terminal group are more then those in the screen group and the primary terminal position is not significant then a direct mapping scheme is employed also. One example of such a mapping is as follows:

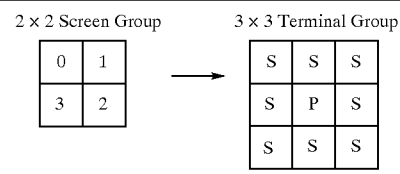

In this example the 2×2 terminal group subset chosen from the 3×3 terminal group must include the primary terminal P. In this example, the primary terminal position allows all 2×2 subsets to be chosen to map to the screen group.

Another example that uses the direct mapping scheme is where there are more terminal group columns or rows than screen group columns or rows or both and the primary terminal position is significant. One example of such a mapping is as follows:

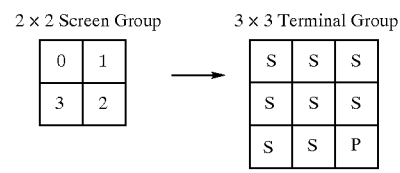

In this situation, the only 2×2 subset that may be chosen which includes the primary terminal is the lower right hand corner subset.

Degenerate Mapping Scheme

A degenerate mapping scheme is employed in cases where the columns in the screen group exceeds the columns in the terminal group or the rows in the screen group exceed the rows in the terminal group.

A first example of a degenerate case is where the screen group columns are less then or equal to the terminal group columns and the screen group rows are greater then the terminal group rows. An example of a mapping in this situation is as follows:

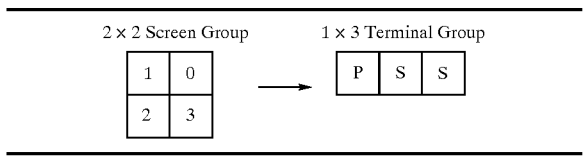

In one embodiment using this mapping scheme, the computing device outputting the screen group, such as a server, can use a mapping using the screen group's columns and the terminal group's rows (1×2) where P is included in the mapping. In another embodiment, the output device only uses the primary address and maps all screens onto it.

Another example occurs where the screen group columns exceeds the terminal group columns and the screen group rows is less than or equal to the terminal group rows. In this case, an example mapping is as follows:

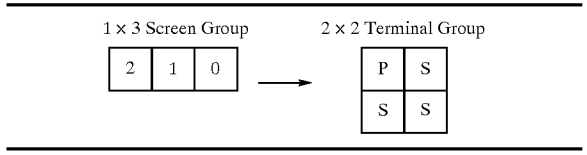

In one embodiment, the output device uses a mapping where the terminal group columns and the screen group rows are used (1×2), which includes P for the mapping. In another embodiment, the output device only uses the primary address and maps all screens onto it.

Another example occurs when the screen group columns is greater then the terminal group columns and the screen group rows is greater then the terminal group rows. An example mapping in this case is as follows:

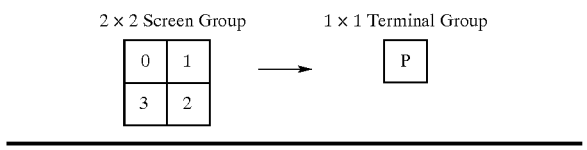

In one embodiment, the output device uses the terminal group rows and the terminal group columns (1×1) which includes P for the mapping.

Screen Navigation

In the degenerate cases, there exists, by definition, fewer simultaneously viewable screens than the total number of screens in the screen group, because fewer than the required number of terminals exist in the terminal group to cleanly map the screen group geometry to the terminal group geometry. In this case, "screen flipping" is used to allow a user to access a screen that is not currently visible.

Screen flipping transforms the user's computing environment into one that is larger than what is displayed on the monitor. The user, then, is shown only a portion of the environment at any one time and the other portion of the environment is not visible. If the user wants to move to a portion of the computer environment that is not visible, for instance to access a computer program displayed there, the user positions a pointer at the edge of the currently displayed environment and pushes the screen in the desired direction. Other embodiments of the invention use other tools to navigate the multi-headed configuration, including special keys, key combinations, navigation applications, or any other suitable navigation mechanism.

Figure 4:
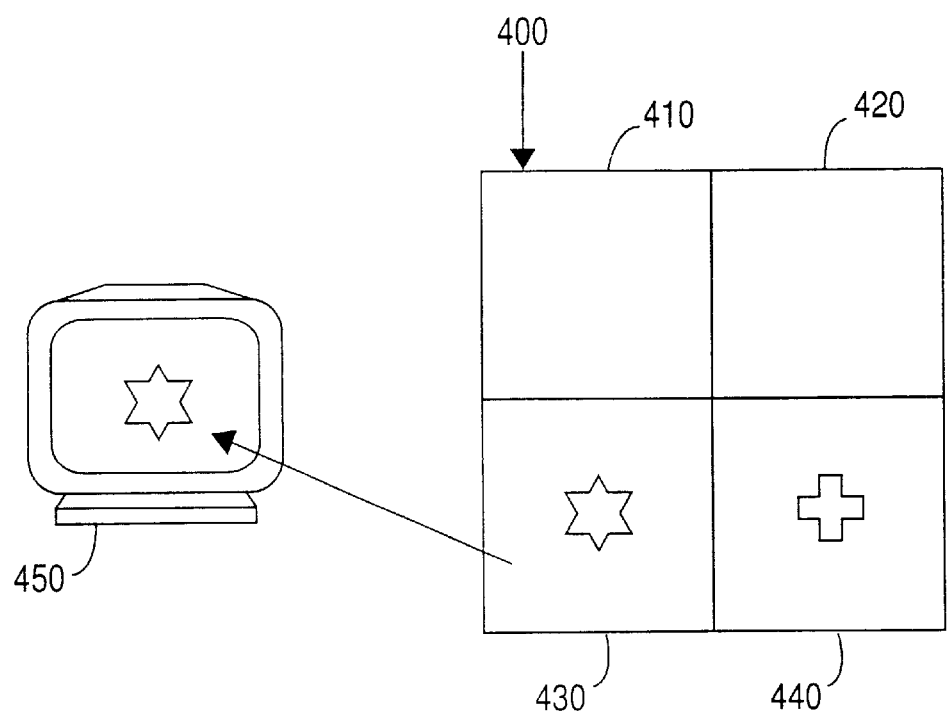
FIG. 4 is an example of screen flipping.
Figure 5:
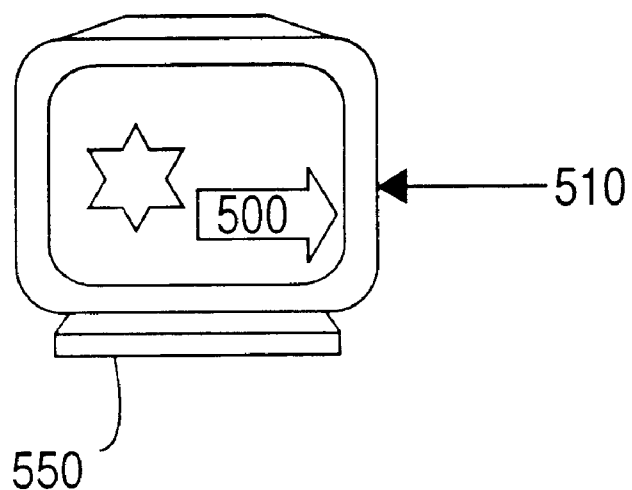
FIG. 5 is an example of screen flipping.
Figure 6:
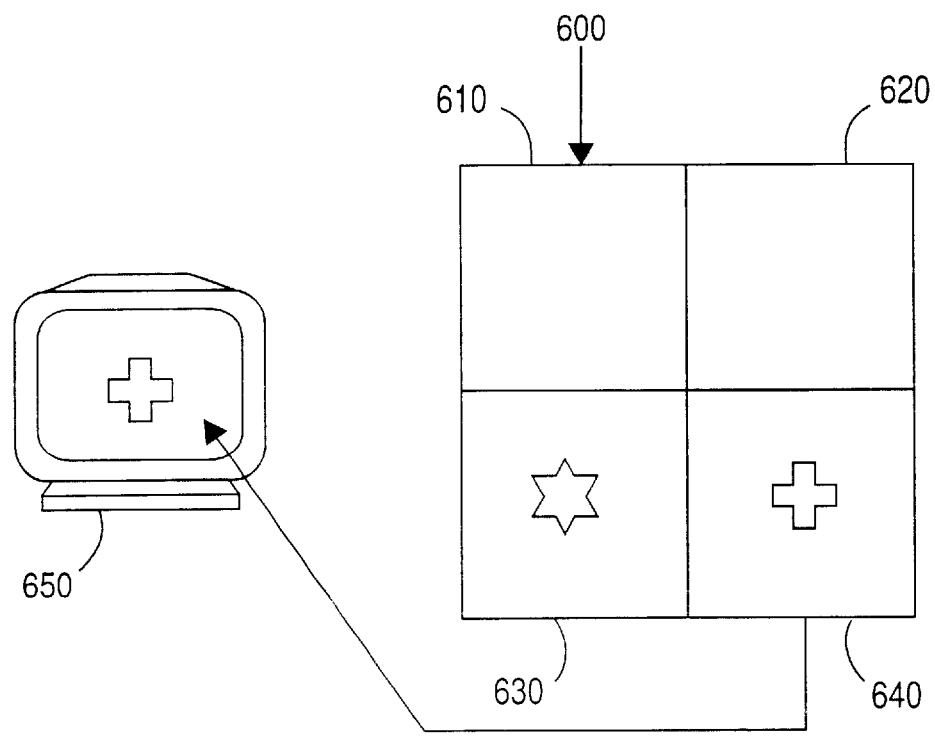
FIG. 6 is an example of screen flipping.

FIGS. 4–6 show how screen flipping may be implemented. Computer environment 400 of FIG. 4 is divided into four segments, 410–440 respectively. Output device 450 displays the currently visible segment 430. In operation, a user positions pointer 500 of FIG. 5 on a portion of the screen 510 where the user desires to push the environment. The environment is then pushed and the direction the user pushes becomes the currently displayed segment enabling the user to access a computer program displayed in that segment. FIG. 6 shows the result of screen flipping in the direction indicated in FIG. 3. In FIG. 6, segment 640 is shown on display device 650.

Virtual Desktop System Architecture

Figure 7:
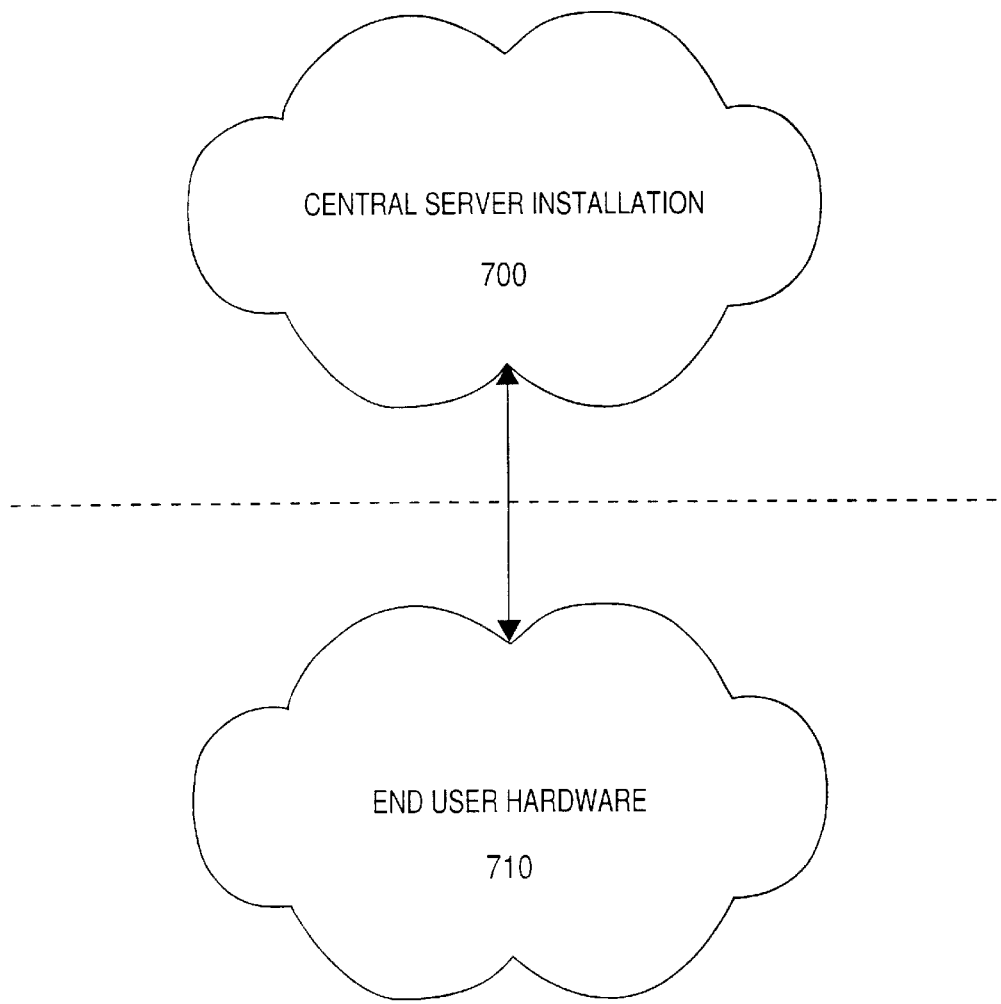
FIG. 7 shows an example of a thin client topology called a virtual desktop system architecture.

FIG. 7 shows an example of a thin client topology called a virtual desktop system architecture. The virtual desktop system architecture provides a re-partitioning of functionality between a central server installation 700 and end user hardware 710. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 8:
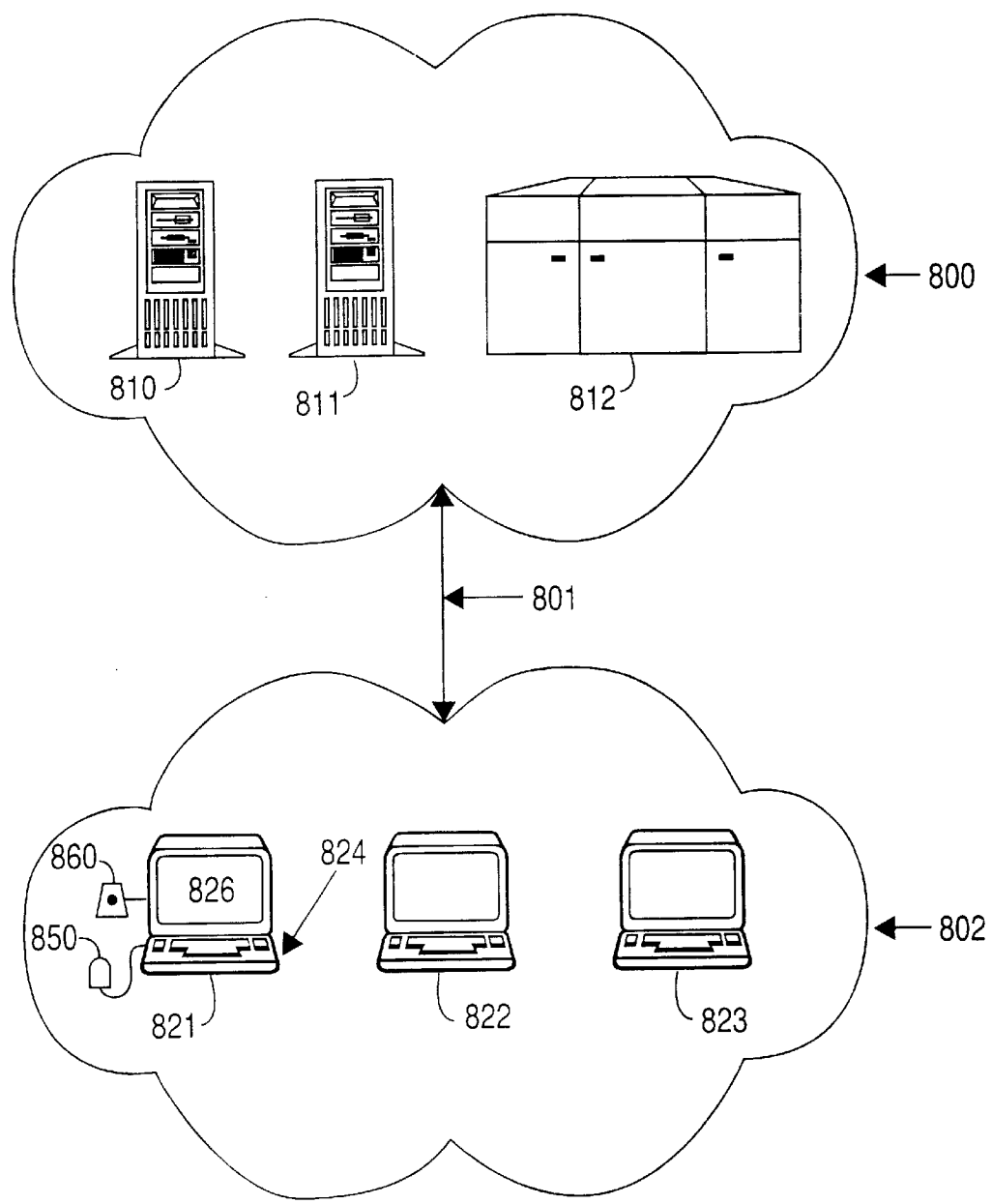
FIG. 8 displays the partitioning of the functionality of the virtual desktop system architecture.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 8, wherein the system comprises computational service providers 800 communicating data through communication link 801 to HIDs 802.

The computational power and state maintenance is provided by the service providers or services. The services are not tied to a specific computer, but may be distributed over one or more traditional desktop systems such as described in connection with FIG. 8, or with traditional servers. One computer may have one or more services, or a service may be implemented by one or more computers. The service provides computation, state and data to HIDs and the service is under the control of a common authority or manager. In FIG. 8, the services are provided by computers 810, 811, and 812. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, and a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 8 illustrates HIDs 821, 822 and 823. Each HID comprises a display 826, a keyboard 824, mouse 850, and audio speakers 860. The HID includes the electronics need to interface these devices to the interconnection fabric and to transmit to and receive data from the services.

Figure 9:
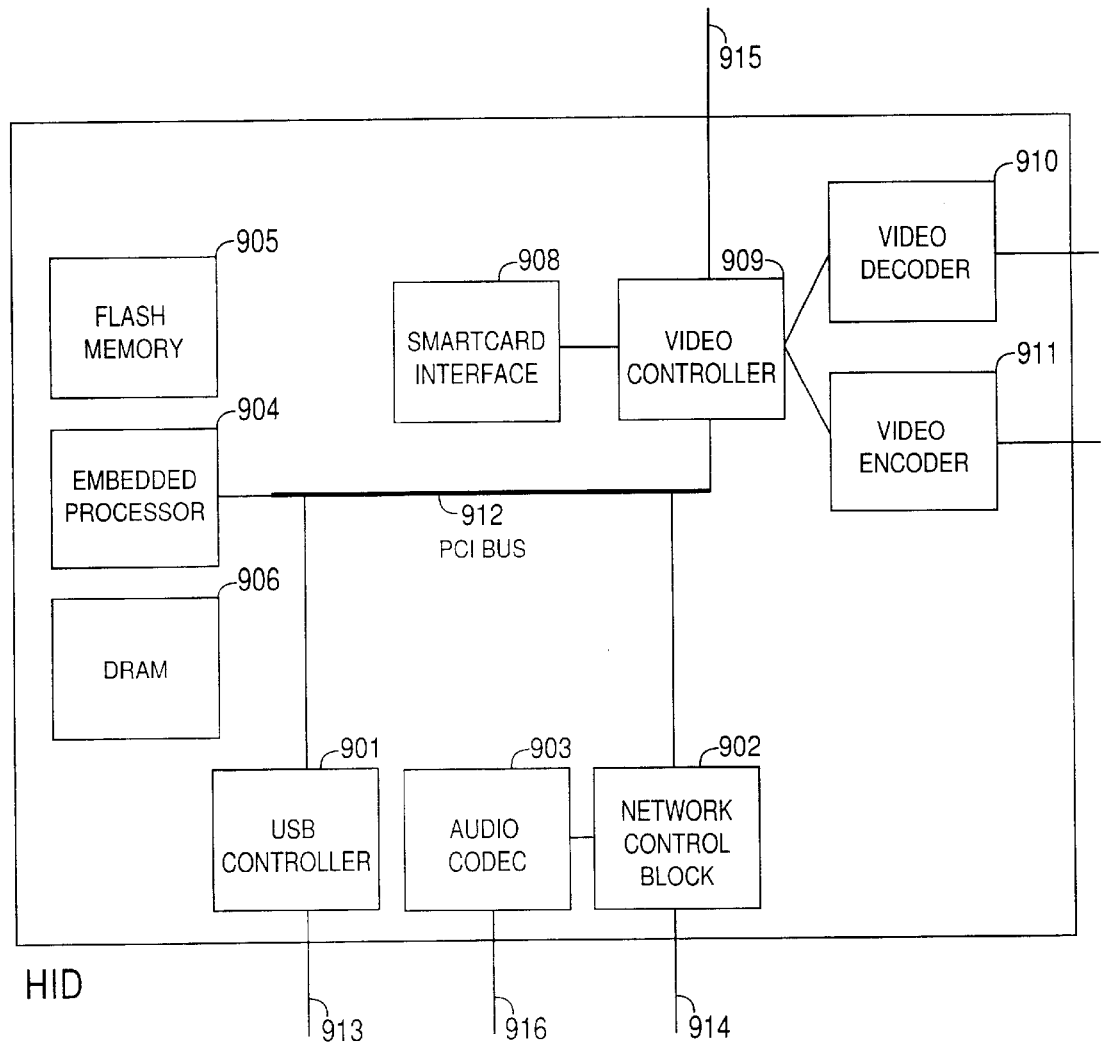
FIG. 9 is a block diagram of an example embodiment of a human interface device.

A block diagram of an example embodiment of the HID is illustrated in FIG. 9. The components of the HID are coupled internally to a PCI bus 912. A network control block 902 communicates to the interconnect fabric, such as an Ethernet, through line 914. An audio codec 903 receives audio data on interface 916 and is coupled to network control block 902. USB data communication is provided on lines 913 to a USB controller 901. The HID further comprises a embedded processor 904 such as a Sparc2ep with coupled flash memory 905 and DRAM 906. The USB controller 901, the network controller 902 and the embedded processor 904 are all coupled to the PCI bus 912. A video controller 909, also coupled to the PCI bus 912, can include an ATI RagePro+ frame buffer controller which provides SVGA output on the line 915. NTSC data is provided in and out of the video controller through video decoder 910 and encoder 911 respectively. A smartcard interface 908 may also be coupled to the video controller 909.

Figure 10:
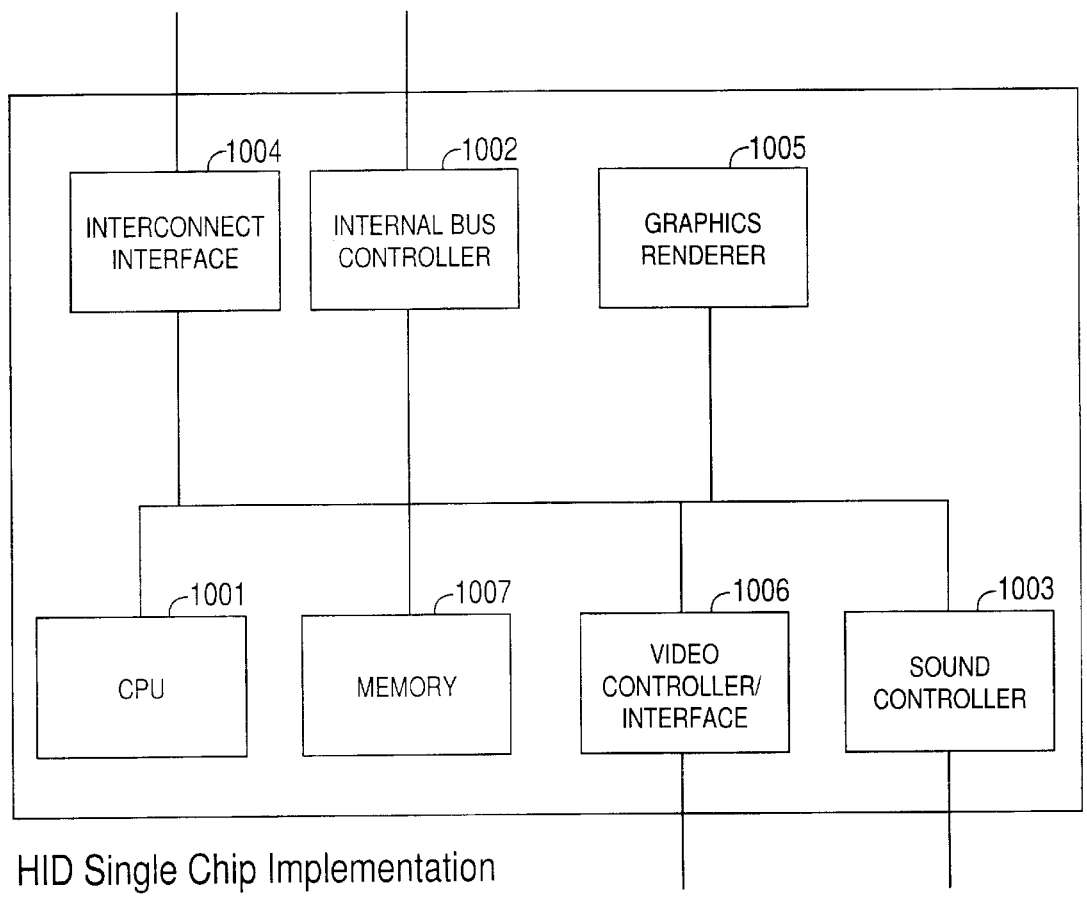
FIG. 10 is a block diagram of a single chip implementation of a human interface device.

Alternatively, the HID can comprise a single chip implementation as illustrated in FIG. 10. The single chip includes the necessary processing capability implemented via CPU 1001 and graphics renderer 1005. Chip memory 1007 is provided, along with video controller/interface 1006. A internal bus (USB) controller 1002 is provided to permit communication to a mouse, keyboard and other local devices attached to the HID. A sound controller 1003 and interconnect interface 1004 are also provided. The video interface shares memory 1007 with the CPU 1001 and graphics renderer 1005. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" now abandoned and assigned to the present assignee, and incorporated herein by reference.

Computer Execution Environment

Figure 11:
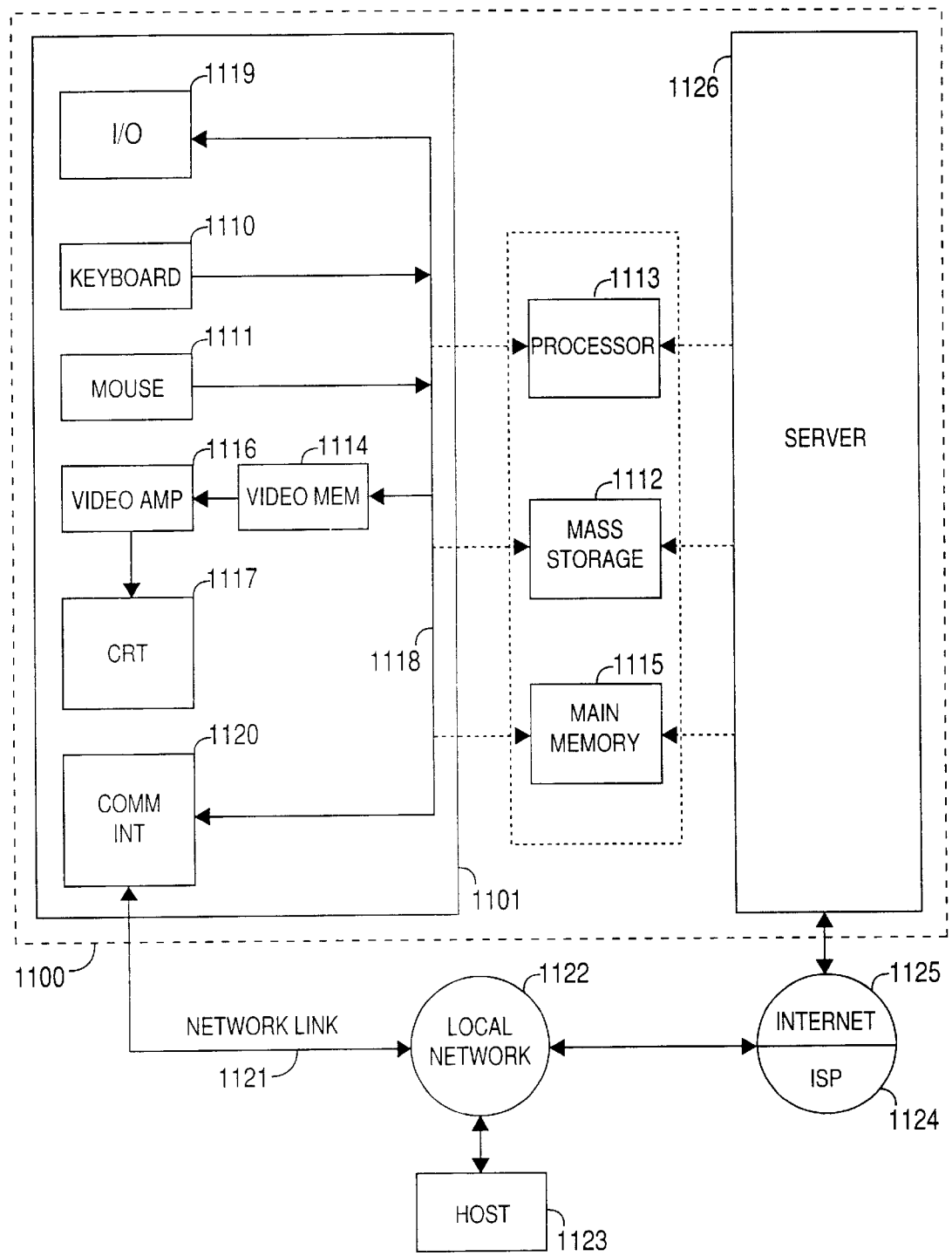
FIG. 11 is an embodiment of a computer execution environment suitable for the present invention.

An embodiment of the invention can be implemented as computer software in the form of computer readable program code executed in a general purpose computing environment such as environment 1100 illustrated in FIG. 11, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1110 and mouse 1111 are coupled to a system bus 1118. The keyboard and mouse are for introducing user input to the computer system and communicating that user input to central processing unit (CPU) 1113. Other suitable input devices may be used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 may include a communication interface 1120 coupled to bus 1118. Communication interface 1120 provides a two-way data communication coupling via a network link 1121 to a local network 1122. For example, if communication interface 1120 is an integrated services digital network (ISDN) card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals which carry digital data streams representing various types of information.

Network link 1121 typically provides data communication through one or more networks to other data devices. For example, network link 1121 may provide a connection through local network 1122 to local server computer 1123 or to data equipment operated by ISP 1124. ISP 1124 in turn provides data communication services through a world wide packet data communication network, such as the Internet 1125. Local network 1122 and Internet 1125 both use electrical, electromagnetic or optical signals which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1126 or processor 1113 may have its computational power distributed between computer 1101 and server 1126. Server 1126 symbolically is represented in FIG. 11 as one unit, but server 1126 can also be distributed between multiple "tiers". In one embodiment, server 1126 comprises a middle and back tier where application logic executes in the middle tier and persistent data is obtained in the back tier. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output.

Computer 1101 includes a video memory 1114, main memory 1115 and mass storage 1112, all coupled to bidirectional system bus 1118 along with keyboard 1110, mouse 1111 and processor 1113. As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture, in architectures where PDAs are used, in Internet enabled cellular phones and other Internet computing devices, and in platform independent computing environments, such as those which utilize the Java technologies.

The mass storage 1112 may include both fixed and removable media, such as magnetic, optical or magnetic optical storage systems or any other available mass storage technology. Bus 1118 may contain, for example, thirty-two address lines for addressing video memory 1114 or main memory 1115. The system bus 1118 also includes, for example, a 32-bit data bus for transferring data between and among the components, such as processor 1113, main memory 1115, video memory 1114 and mass storage 1112. Alternatively, multiplex data/address lines maybe used instead of separate data and address lines.

In one embodiment of the invention, the processor 1113 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121, and communication interface 1120. In the Internet example, remote server computer 1126 might transmit a requested code for an application program through Internet 1125, ISP 1124, local network 1122 and communication interface 1120. The received code maybe executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122 and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network and carrier waves.

The computer systems described above are for purposes of example only. An embodiment of the invention may be implemented in any type of computer system or programming or processing environment.

Thus, multi-screen session mobility between terminal groups is described in conjunction with one or more specific embodiments. The invention is defined by the claims and their full scope of equivalents.

What is claimed is:

1. A mobile multi-screen network system comprising:
    a grouped server environment comprising a plurality of servers for providing a single computer session;
    a plurality of screen members of a screen group;
    a primary Human Interface Device of a terminal group;
    a plurality of secondary Human Interface Devices of said terminal group;
    a list generated by said grouped server environment, said list comprising the location of said primary Human Interface Device, the geometry of said terminal group and the address of each of said primary and said secondary Human Interface Devices within said terminal group;
    a network;
    wherein said plurality of servers are connected with said primary Human Interface Device and said secondary Human Interface Devices via said network;
    wherein said list is used by said server environment to map said members of said screen group across said network onto said primary Human Interface Device and said plurality of secondary Human Interface Devices of said terminal group; and
    wherein said members of said screen group are associated with a single display for said single computing session that is outputted by said grouped server environment comprising said plurality of servers for providing said single computing session.

2. The mobile multi-screen network system of claim 1, wherein said primary Human Interface Device provides a network interface to a user and wherein said plurality of servers provides a plurality of computational services removed from said primary Human Interface Device to said user.

3. The mobile multi-screen network system of claim 2, wherein said plurality of computational services comprise a computational power for said primary Human Interface Device and a state maintenance for said primary Human Interface Device.

4. The mobile multi-screen network system of claim 1, wherein said primary and secondary Human Interface Devices are stateless devices.

5. The mobile multi-screen network system of claim 1, wherein said mapping of said members onto said primary Human Interface Device and said plurality of secondary Human Interface Devices is transparent to said single computing session.

6. The mobile multi-screen network system of claim 1, wherein said members of said screen group are arranged in a first geometric pattern.

7. The mobile multi-screen network system of claim 6, wherein said primary Human Interface Device and said plurality of secondary Human Interface Devices of said terminal group are arranged in a second geometric pattern.

8. The mobile multi-screen network system of claim 7, wherein said first and second geometric patterns are defined by a plurality of columns and rows.

9. The mobile multi-screen network system of claim 7, wherein columns in said first geometric pattern are not greater than said columns in said second geometric pattern.

10. The mobile multi-screen network system of claim 7, wherein said rows in said first geometric pattern are greater than said rows in said second geometric pattern.

11. The mobile multi-screen network system of claim 7, wherein said rows in said first geometric pattern are not greater than said rows in said second geometric pattern.

12. The mobile multi-screen network system of claim 7, wherein said columns in said first geometric pattern are greater than said columns in said second geometric pattern.

13. The mobile multi-screen network system of claim 7, wherein said list for mapping are generated by said grouped server environment independently from said single computing session and wherein said list comprises a description of said terminal group.

14. The mobile multi-screen network system of claim 1, further comprising groups of Human Interface Devices connected to said server environment via said network and wherein said list for mapping is used to provide for multi-screen session mobility when said single computing session moves between groups of Human Interface Devices.

15. The mobile multi-screen network system of claim 14, wherein said groups of Human Interface Devices comprise said terminal group and another terminal group.

16. The mobile multi-screen network system of claim 1, wherein said primary and secondary Human Interface Devices are associated to simulate a multi-head display unit.

17. The mobile multi-screen network system of claim 1, wherein said plurality of servers provide a computational power for said primary Human Interface Device and a state maintenance for said primary Human Interface Device.

18. The mobile multi-screen network system of claim 1, wherein said primary Human Interface Device is where a user logs into said single computing session.

\* \* \* \* \*